(12) United States Patent
Ono

(10) Patent No.: US 11,647,135 B2
(45) Date of Patent: May 9, 2023

(54) IMAGE FORMING APPARATUS PREVENTING DAMAGE TO CABLE

(71) Applicant: KYOCERA Document Solutions Inc., Osaka (JP)

(72) Inventor: Tomohisa Ono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/649,848

(22) Filed: Feb. 3, 2022

(65) Prior Publication Data

US 2022/0256046 A1 Aug. 11, 2022

(30) Foreign Application Priority Data

Feb. 10, 2021 (JP) ............................. JP2021-019479

(51) Int. Cl.
*H04N 1/00* (2006.01)
*H04N 1/12* (2006.01)

(52) U.S. Cl.
CPC ..... *H04N 1/00602* (2013.01); *H04N 1/00588* (2013.01); *H04N 1/12* (2013.01)

(58) Field of Classification Search
CPC .............. G03G 15/80; G03G 21/1652; G03G 2221/166; G03G 15/605; G03G 15/60; G03G 21/1633; H04N 1/00519; H04N 1/00551; H04N 1/00557; H04N 1/0083; H04N 2201/0094; H04N 1/2307; G06K 15/00
USPC ....................................................... 358/1.15
See application file for complete search history.

(56) References Cited

U.S. PATENT DOCUMENTS

| | | | | | |
|---|---|---|---|---|---|
| 5,543,831 | A | * | 8/1996 | Tsuji ...................... | H04N 7/183 348/E7.087 |
| 7,009,730 | B2 | * | 3/2006 | Ikeda .................... | H05K 5/0247 257/676 |
| 7,621,519 | B2 | * | 11/2009 | Sagawa ..................... | B65H 5/36 271/4.01 |
| 11,431,863 | B2 | * | 8/2022 | Ogawa ............... | H04N 1/00559 |
| 2009/0040545 | A1 | * | 2/2009 | Kubochi ............ | H04N 1/00554 358/1.13 |

(Continued)

FOREIGN PATENT DOCUMENTS

| | | |
|---|---|---|
| JP | 2001142272 A | 5/2001 |
| JP | 2009294409 A | 12/2009 |

*Primary Examiner* — Negussie Worku
(74) *Attorney, Agent, or Firm* — Alleman Hall Creasman & Tuttle LLP

(57) ABSTRACT

An image forming apparatus includes a housing, a document sheet conveying device, a cable, a shielding member, a protrusion, and a guide member. The housing accommodates a document sheet reading device that reads a document sheet. The document sheet conveying device is coupled to an upper surface of the housing with a hinge, and conveys the document sheet along a conveyance path passing through a scanning position of the document sheet reading device. The cable electrically connects a circuit board accommodated in the housing to the document sheet conveying device. The shielding member surrounds the circuit board and includes an opening portion through which the cable passes. The protrusion is formed in the cable. The guide member has an annular groove portion in which the protrusion is displaceable in a circumferential direction of the cable, and is fitted into the opening portion.

6 Claims, 11 Drawing Sheets

(56) References Cited

U.S. PATENT DOCUMENTS

| | | | |
|---|---|---|---|
| 2011/0235139 A1* | 9/2011 | Kurokawa | G03G 15/60 |
| | | | 358/498 |
| 2018/0002019 A1* | 1/2018 | Benedik | B64D 1/16 |
| 2018/0176395 A1* | 6/2018 | Tokonami | H04N 1/103 |
| 2021/0286308 A1* | 9/2021 | Ishikawa | G03G 15/80 |
| 2022/0103708 A1* | 3/2022 | Takahashi | H04N 1/00559 |
| 2022/0103709 A1* | 3/2022 | Ilic | G06T 7/74 |
| 2022/0256046 A1* | 8/2022 | Ono | H04N 1/00602 |
| 2022/0260936 A1* | 8/2022 | Misao | G03G 13/20 |
| 2022/0279670 A1* | 9/2022 | Sato | G03G 21/1652 |

* cited by examiner

IMAGE FORMING APPARATUS PREVENTING DAMAGE TO CABLE

INCORPORATION BY REFERENCE

This application is based upon and claims the benefit of priority from the corresponding Japanese Patent Application No. 2021-019479 filed on Feb. 10, 2021, the entire contents of which are incorporated herein by reference.

BACKGROUND

The present disclosure relates to an image forming apparatus forming an image on a sheet.

An image forming apparatus including a printer, an image scanner (hereinafter, referred to as a scanner), and a document sheet conveying device has been conventionally known. The document sheet conveying device conveys a document sheet along a conveyance path through which the document sheet passes via a scanning position of the scanner. The scanner reads the document sheet at the scanning position and generates an image data. The printer uses the image data generated by the scanner and forms an image on a sheet. The printer and the scanner are accommodated in a housing. The document sheet conveying device is provided on an upper surface of the housing and is opened and closed through a hinge. The document sheet conveying device is flipped up, and the document sheet is placed on a document sheet table of the scanner, which can also read the document sheet.

The document sheet conveying device is electrically connected to a circuit board accommodated in the housing, by using a cable. A contact between the cable and its peripheral portions, bending and twisting of the cable may occur along with opening and closing of the document sheet conveying device. Therefore, the cable may be damaged by long-term use. Thus, techniques for protecting the cable have been conventionally studied. An example of proposals is a technique that regulates longitudinal movement of the cable while allowing twisting of the cable by forming a guide portion guiding the cable on the document sheet conveying device, by mounting a cover member positioning the cable at the guide portion to the document sheet conveying device, and by sandwiching opposite sides of a protrusion (cable tie) formed on a part of the cable in a longitudinal direction with the cover member. In addition, an example of proposals is a technique that fixes one end of a bundled wire cover for passing the cable to a position in the vicinity of a rotation fulcrum on an upper surface of an image forming apparatus, and that fixes the other end of the bundled wire cover through the vicinity of a rotation fulcrum on a bottom surface of the document sheet conveying device.

SUMMARY

An image forming apparatus according to the present disclosure includes a housing, a document sheet conveying device, a cable, a shielding member, a protrusion, and a guide member. The housing accommodates a document sheet reading device that reads a document sheet. The document sheet conveying device is coupled to an upper surface of the housing through a hinge, and conveys the document sheet along a conveyance path through which the document sheet passes via a scanning position of the document sheet reading device. The cable electrically connects a circuit board accommodated in the housing to the document sheet conveying device. The shielding member surrounds the circuit board and includes an opening portion through which the cable passes. The protrusion is formed in the cable. The guide member has an annular groove portion in which the protrusion is displaceable in a circumferential direction of the cable, and is fitted into the opening portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following will describe an image forming apparatus 100 according to an embodiment of the present disclosure with reference to accompanying drawings.

Figure 1:
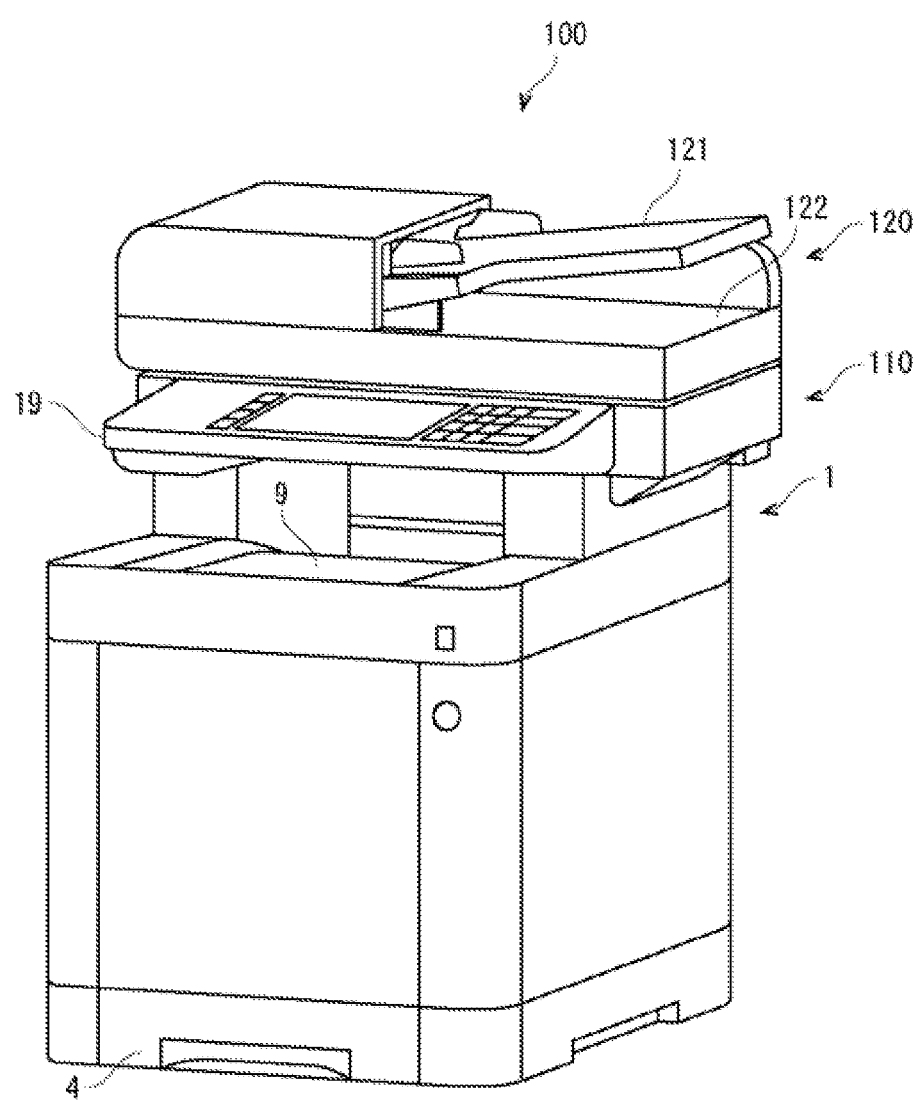
FIG. 1 is a perspective view of an appearance of an image forming apparatus according to an embodiment of the present disclosure.
Figure 2:
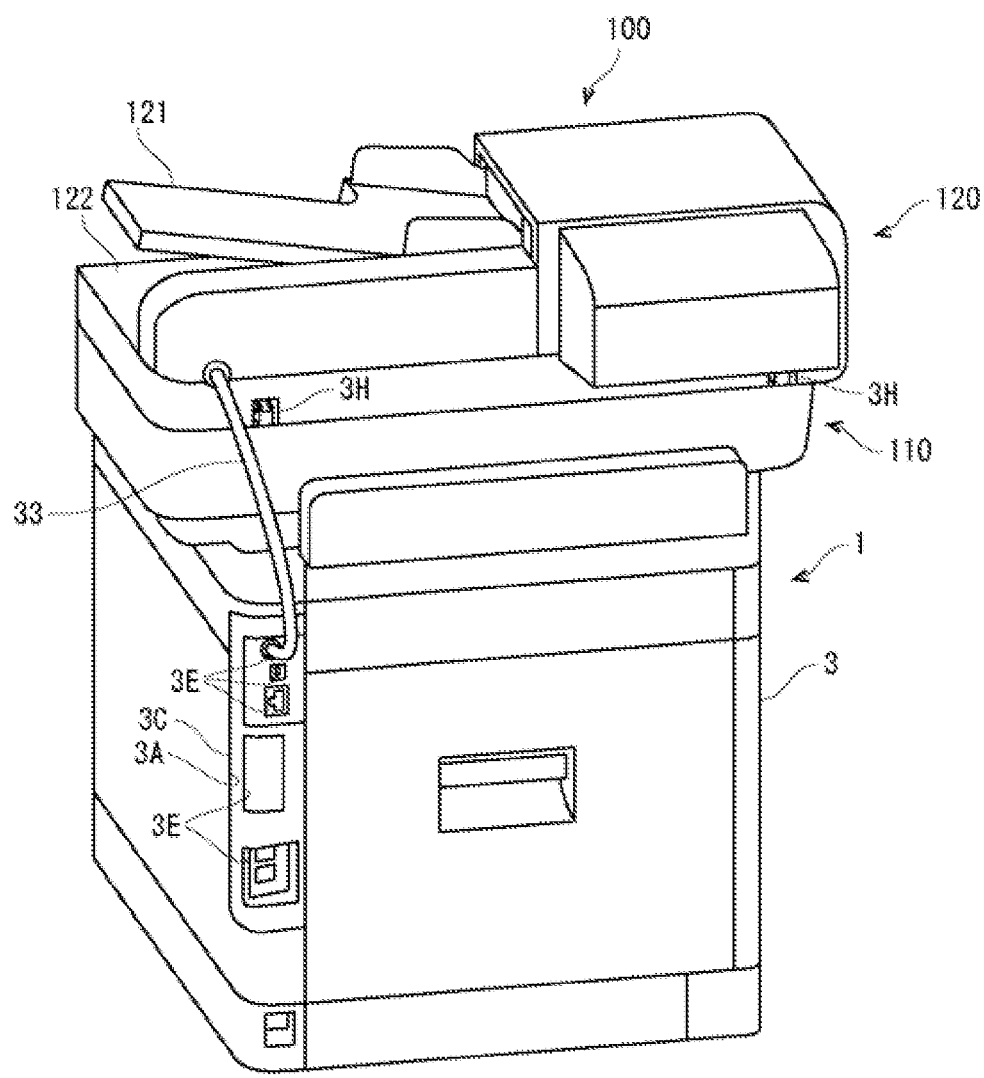
FIG. 2 is a perspective view of the appearance of the image forming apparatus.
Figure 2:
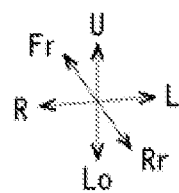
Figure 3:
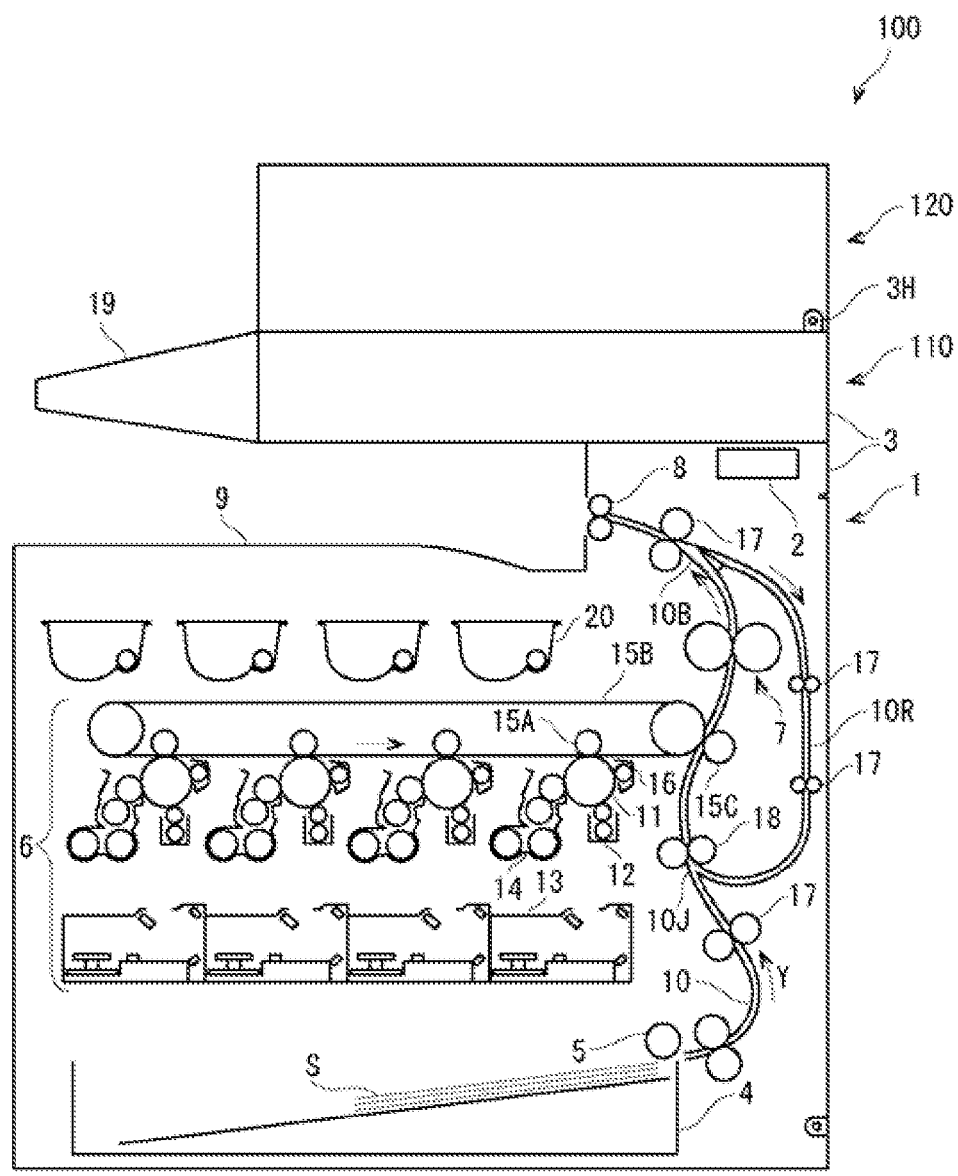
FIG. 3 is a side view schematically illustrating an internal configuration of the image forming apparatus.
Figure 3:
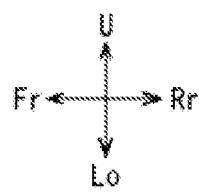

Firstly, an overall configuration of the image forming apparatus 100 will be described. FIGS. 1 and 2 are perspective views of an appearance of the image forming apparatus 100. FIG. 3 is a side view schematically illustrating an internal configuration of the image forming apparatus 100. Hereinafter, a front side of the image forming apparatus 100 corresponds to a left side of a sheet on which FIG. 3 is drawn, and a left-right direction is defined with reference to a direction in which the image forming apparatus 100 is viewed from the front side. In each drawing, reference signs U, Lo, L, R, Fr, and Rr indicate upper, lower, left, right, front, and rear orientations, respectively.

The image forming apparatus 100 includes a printer 1, a scanner 110 (an example of a document sheet reading device), and a document sheet conveying device 120. A scanner 110 is provided above the printer 1, and the document sheet conveying device 120 is provided above the scanner 110. The document sheet conveying device 120 conveys a document sheet along a conveyance path through which the document sheet passes via a scanning position of the scanner 110. The scanner 110 is a flatbed type image scanner that reads the document sheet and generates an image data. The printer 1 forms an image on a sheet S by an electrophotographic method.

The printer 1 and the scanner 110 are integrally formed with each other by a housing 3 having rectangular parallelepiped shape. The housing 3 accommodates, in its lower part, a sheet feed cassette 4 storing the sheet S, and accommodates a paper feed roller 5 feeding the sheet S out of the sheet feed cassette 4. The housing 3 has, in an upper part of the sheet feed cassette 4, an image forming device 6 forming a toner image by the electrophotographic method and a fixing device 7 fixing the toner image to the sheet S. The housing 3 has, in an upper part of the image forming device 6, a pair of sheet discharge rollers 8 discharging the sheet S onto which the toner image is fixed, and a sheet discharge tray 9 onto which the discharged sheet S is placed.

The image forming device 6 includes: a photoconductor drum 11 whose electric potential changes by light irradiation; a charging device 12 charging the photoconductor drum 11 by electric discharge; an exposure device13 emitting laser light depending on the image data; a developing unit 14 supplying a toner to the photoconductor drum 11; a primary transfer roller 15A generating transfer bias, an intermediate transfer belt 15B to which the toner image of the photoconductor drum 11 is transferred; a secondary transfer roller 15C generating transfer bias; and a cleaning device 16 removing a toner remaining on the photoconductor drum 11. A toner container 20 supplying the toner to the developing unit 14 is connected to the developing unit 14.

The housing 3 has, in its inside, a conveyance path 10 being continuous from the paper feed roller 5 to the fixing device 7 through the image forming device 6, and reaching the pair of sheet discharge rollers 8. The conveyance path 10 has a plurality of pair of conveying rollers 17 each conveying the sheet S. A pair of resist rollers 18 is provided on an upstream side of the image forming device 6 in a conveyance direction. An inverted conveyance path 10R is branched from the conveyance path 10 at a branched point 10B between the fixing device 7 and the pair of sheet discharge rollers 8, and is confluent with the conveyance path 10 at a confluent point 10J between the paper feed roller 5 and the pair of resist rollers 18.

A control portion 2 has a processor and a memory. The processor is, for example, a Central Processing Unit (CPU). The memory includes storage media such as a Read Only Memory (ROM), Random Access Memory (RAM), an Electrically Erasable Programmable Read Only Memory (EEPROM). The processor implements various kinds of processes by reading and executing various kinds of control programs stored in the memory. The control portion 2 may be realized by an integrated circuit without using a software.

An operation panel 19 is provided at a front side of the scanner 110. The operation panel 19 includes a display panel, a touch panel provided on a display surface of the display panel, and a keypad adjacent to the display panel. The control portion 2 causes a screen showing an operation menu of the printer 1 and the scanner 110 to be displayed on the display panel, and controls each component of the printer 1 and the scanner 110 in response to an operation detected by the touch panel and the keypad.

A basic image forming operation of the printer 1 is as follows. When the printer 1 receives a printing job from an external computer or the like, the paper feed roller 5 feeds the sheet S from the sheet feed cassette 4 to the conveyance path 10; subsequently, the pair of resist rollers 18 with its rotation stopped corrects skewing of the sheet S and feeds the sheet S to the image forming device 6 at a predetermined timing. In the image forming device 6, the charging device 12 charges the photoconductor drum 11 to a predetermined electric potential, the exposure device 13 writes a latent image on the photoconductor drum 11, and the developing unit 14 develops the latent image using the toner supplied from the toner container 20, thereby forming the toner image; afterwards, the primary transfer roller 15A transfers the toner image to the intermediate transfer belt 15B, and the secondary transfer roller 15C transfers the toner image onto the sheet S. Subsequently, the fixing device 7 fixes the toner image onto the sheet S by melting the toner image while holding and conveying the sheet S, and the pair of sheet discharge rollers 8 discharges the sheet S to the sheet discharge tray 9. The cleaning device 16 removes a toner remaining in the photoconductor drum 11.

Figure 4:
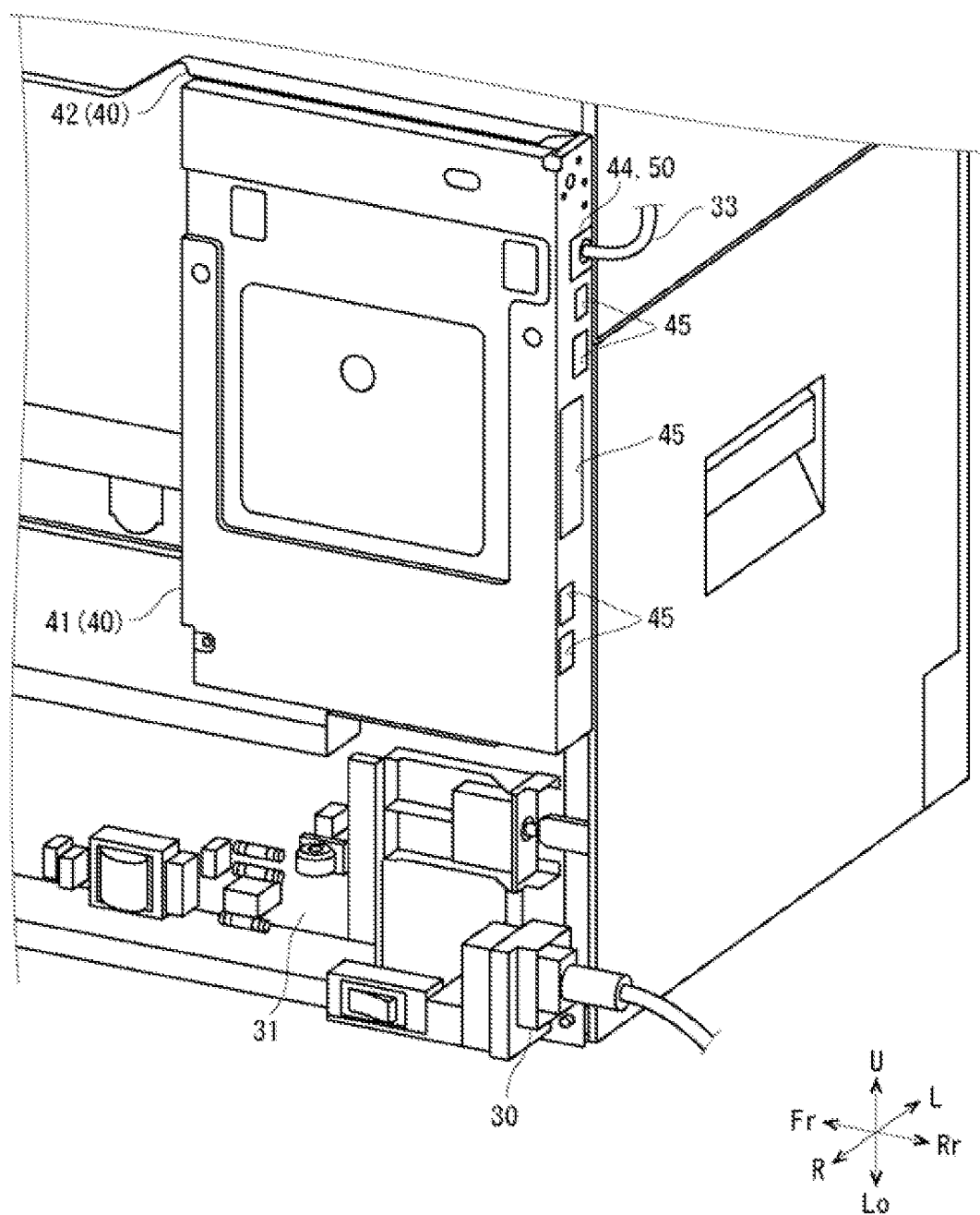
FIG. 4 is a perspective view illustrating the internal configuration of the image forming apparatus (including a shielding member).
Figure 5:
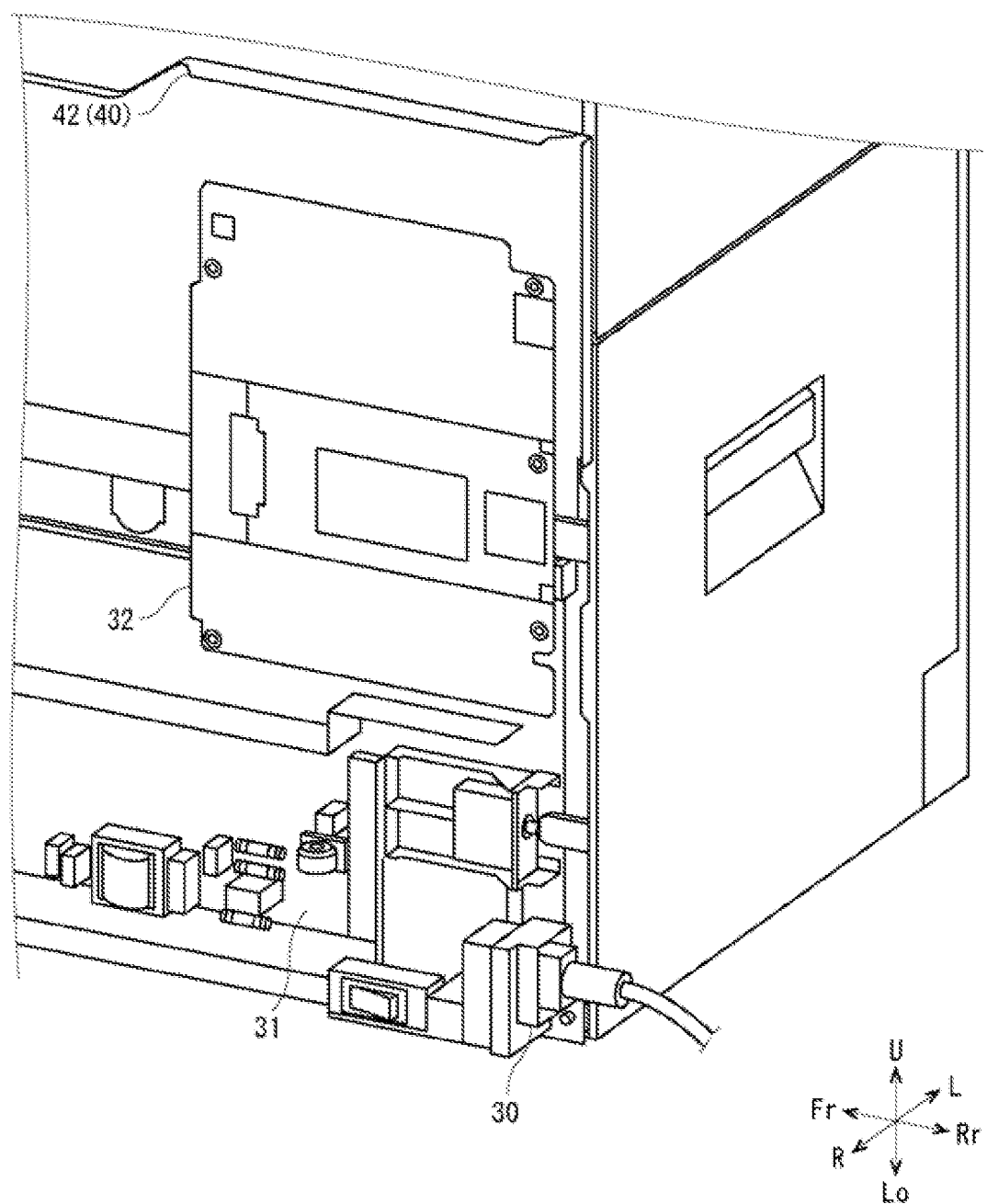
FIG. 5 is a perspective view illustrating the internal configuration of the image forming apparatus (excluding the shielding member).
Figure 6:
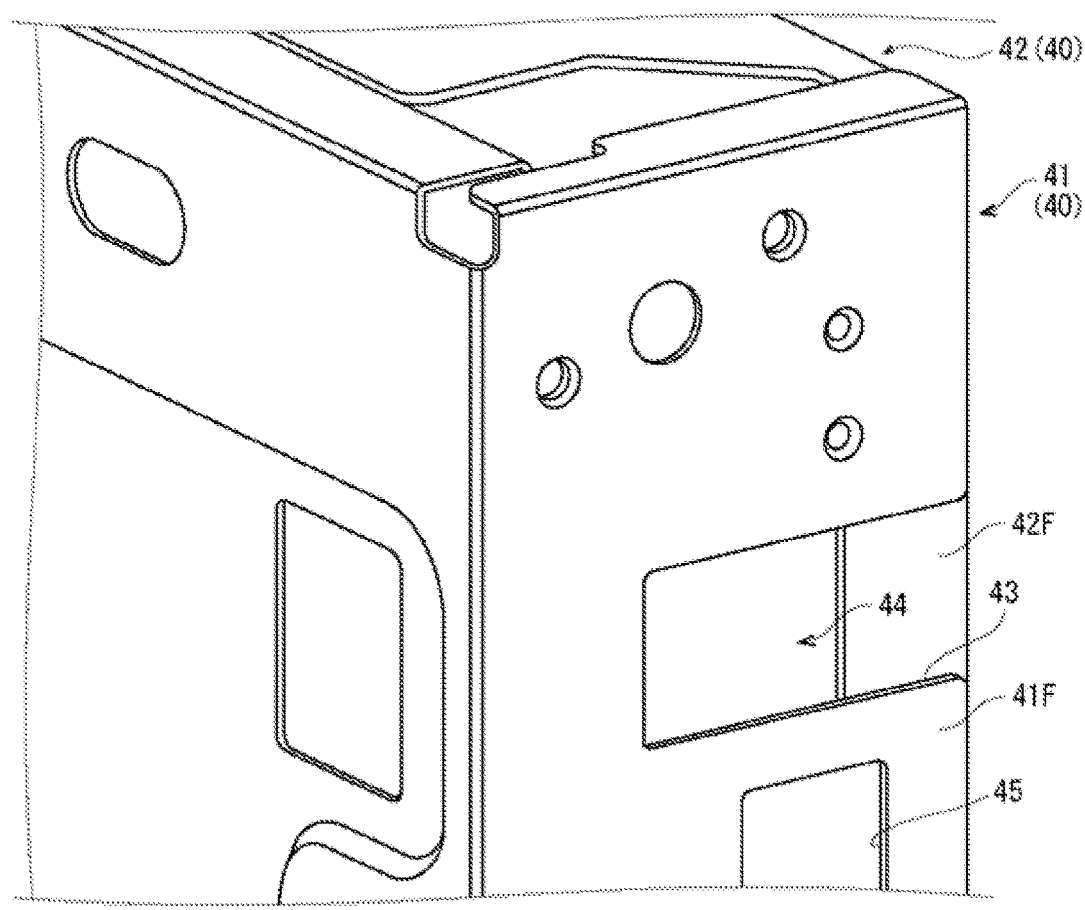
FIG. 6 is a perspective view of an opening portion of the shielding member.
Figure 7:
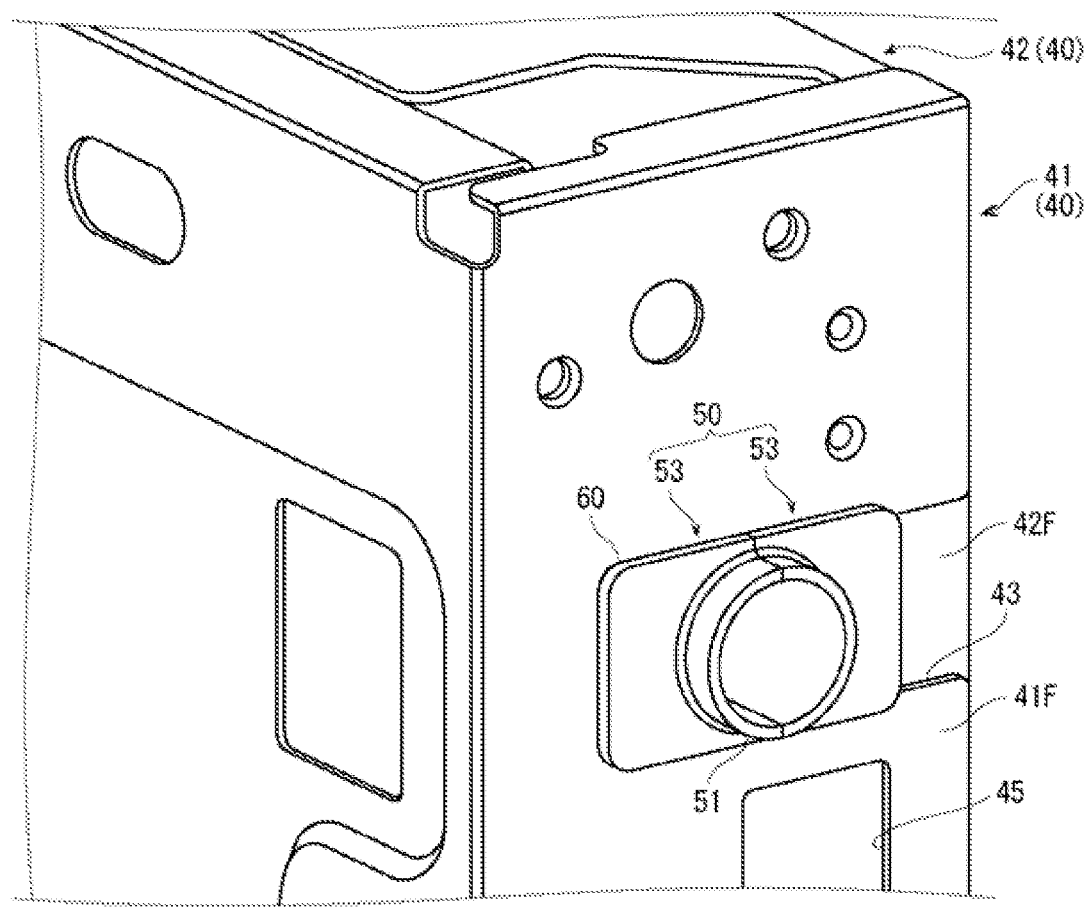
FIG. 7 is a perspective view illustrating a situation in which a guide member is attached to the opening portion.
Figure 8:
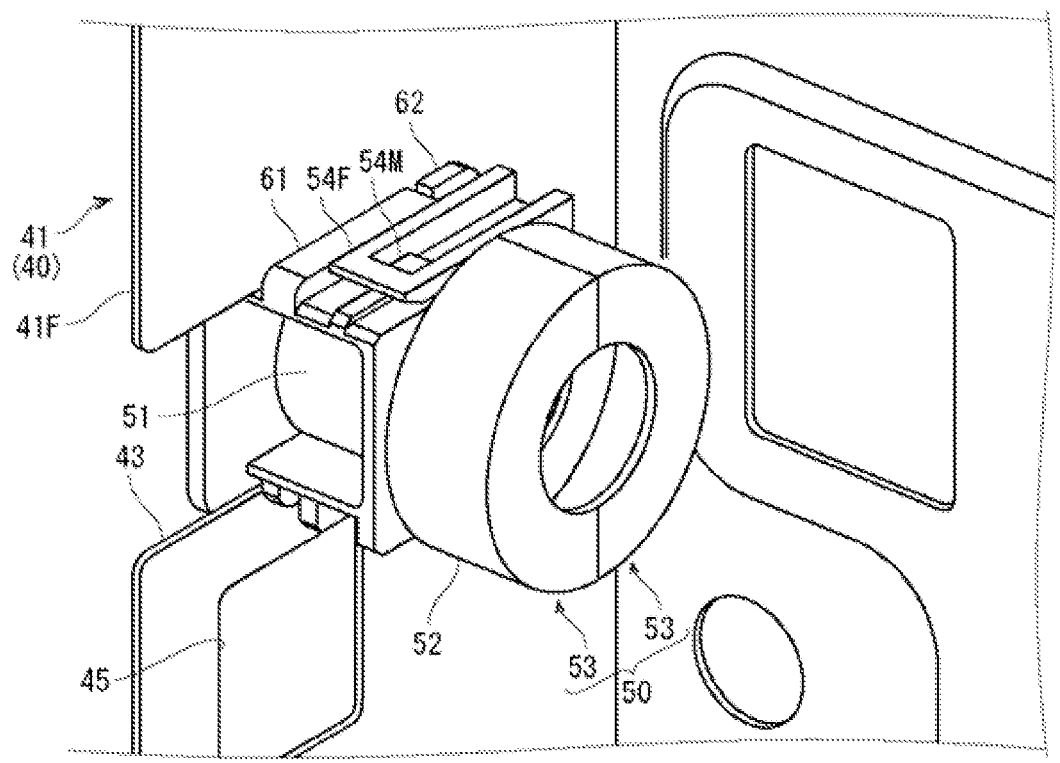
FIG. 8 is a perspective view illustrating a situation in which the guide member is attached to the opening portion.
Figure 8:
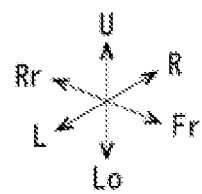
Figure 9:
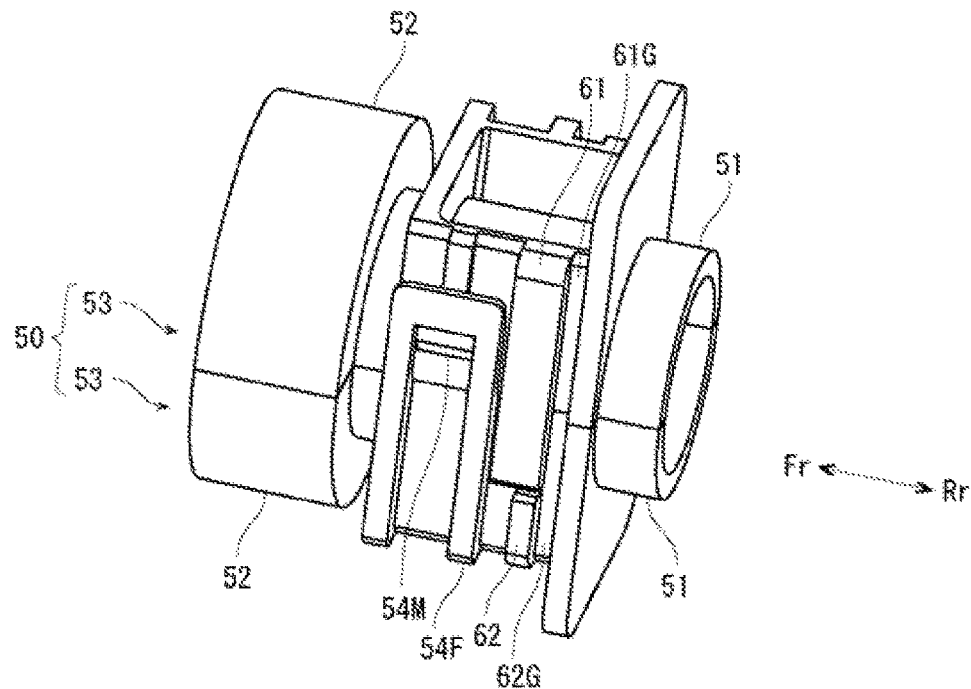
FIG. 9 is a perspective view of the guide member.
Figure 10:
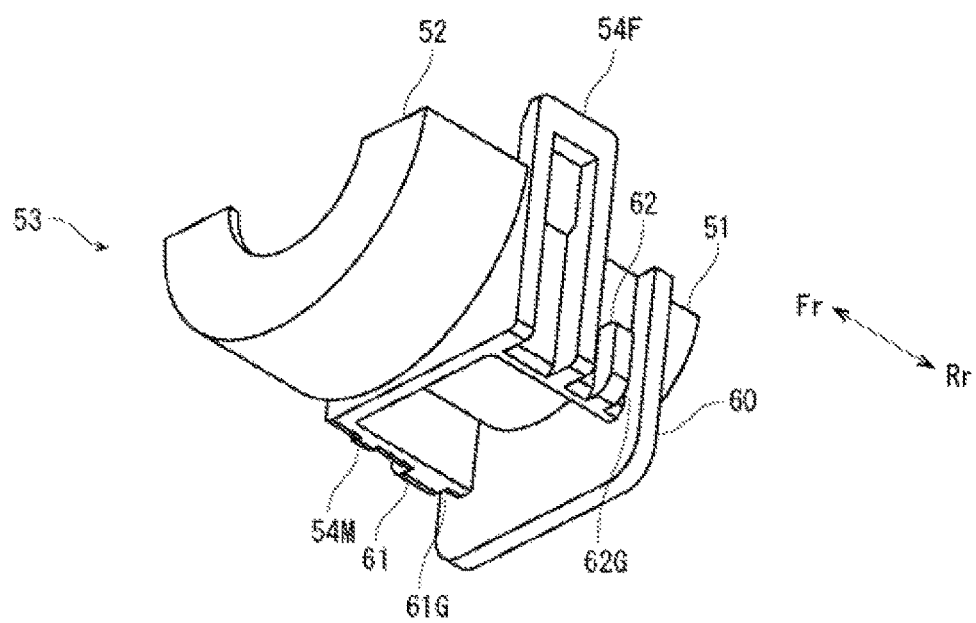
FIG. 10 is a perspective view of a guide assembly.
Figure 11:
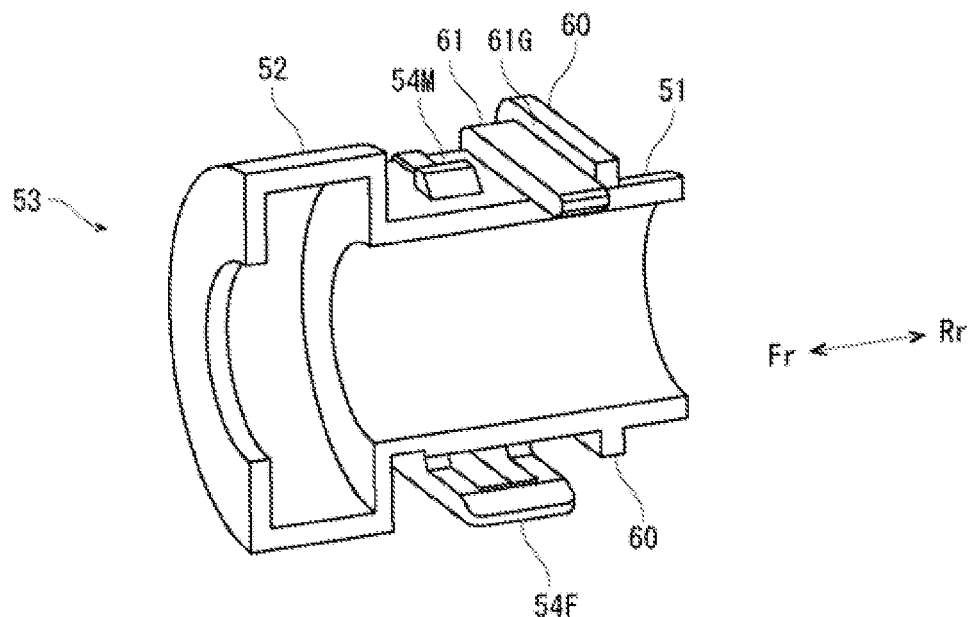
FIG. 11 is a perspective view of the guide assembly.
Figure 12:
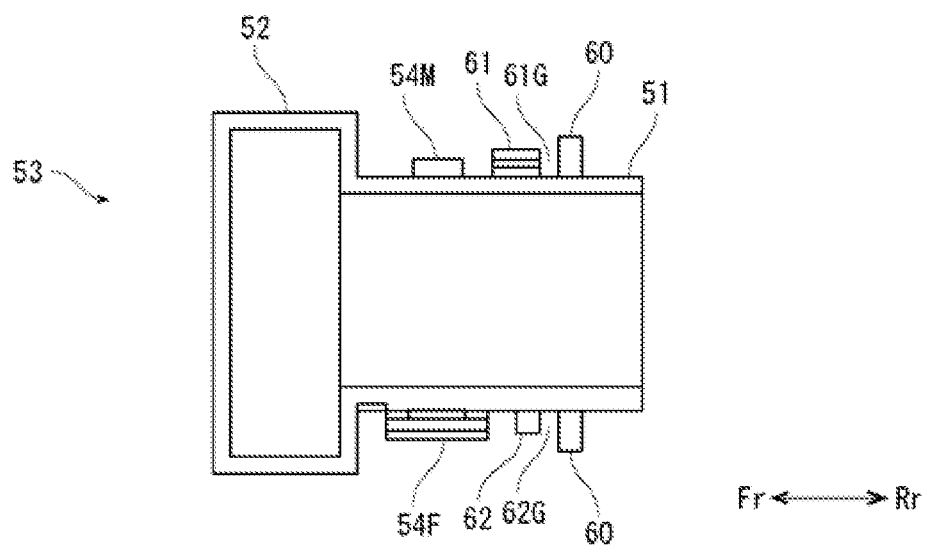
FIG. 12 is a side view of the guide assembly.
Figure 13:
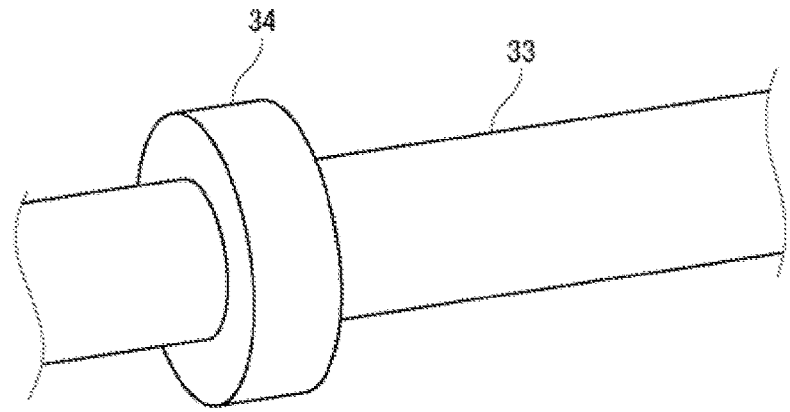
FIG. 13 is a perspective view of a cable and a protrusion.
Figure 14:
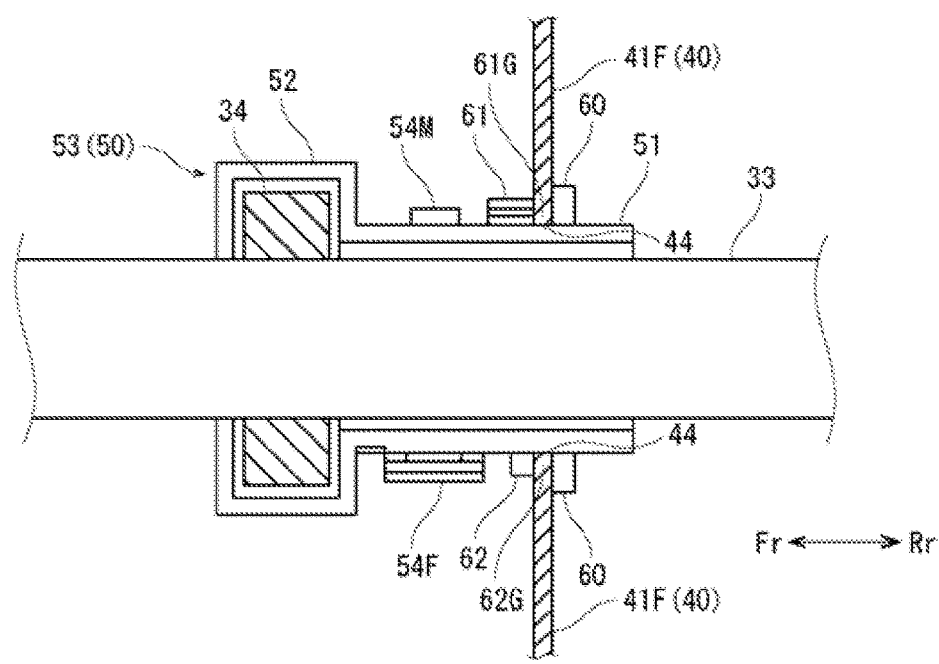
FIG. 14 is a cross sectional view of the cable, the protrusion, and the guide assembly.

Next, a characteristic configuration of the image forming apparatus 100 will be described. FIG. 4 is a perspective view illustrating an internal configuration of the image forming apparatus 100 (including a shielding member 40). FIG. 5 is a perspective view illustrating the internal configuration of the image forming apparatus 100 (excluding the shielding member 40). FIG. 6 is a perspective view of an opening portion 44 of the shielding member 44. FIG. 7 and FIG. 8 are perspective views each illustrating a situation in which a guide member 50 is attached to the opening portion 44. FIG. 9 is a perspective view of the guide member 50. FIG. 10 and FIG. 11 are perspective views each illustrating a guide assembly 53. FIG. 12 is a side view of the guide assembly 53. FIG. 13 is a perspective view of a cable 33 and a protrusion 34. FIG. 14 is a cross sectional view of the cable 33, the protrusion 34, and the guide assembly 53.

The image forming apparatus 100 includes: the housing 3 that accommodates the scanner 110 reading the document sheet; the document sheet conveying device 120 that is coupled to an upper surface of the housing 3 through a hinge 3H and that conveys the document sheet along a conveyance path (not illustrated) through which the document sheet passes via a scanning position of the scanner 110; the cable 33 that electrically connects a circuit board 32 accommodated in the housing 3 to the document sheet conveying device 120; the shielding member 40 surrounding the circuit board 32 and having the opening portion 44 through which the cable 33 passes; the protrusion 34 that is provided in the cable 33; and the guide member 50 having an annular groove portion 52 in which the protrusion 34 can be displaced along a circumferential direction of the cable 33, the guide member 50 that is fitted into the opening portion 44.

[Housing and Document Sheet Conveying Device]

The housing 3 has, on its upper surface, a transparent document sheet table (not illustrated) of the scanner 110. The document sheet conveying device 120 is coupled to the housing 3 through the hinge 3H provided at a rear of the upper surface of the housing 3 (behind the document sheet table, see FIG. 2 and FIG. 3), and can be opened and closed using the hinge 3H as a fulcrum. The document sheet conveying device 120 includes a paper feed tray 121 on which the document sheets is placed, the conveyance path through which the document sheet passes from the paper feed tray 121 to a sheet discharge tray 122 via the scanning position of the scanner 110, and a pair of conveying rollers (not illustrated) conveying the document sheet along the conveyance path.

[Circuit Board and Cable]

The housing 3 has, in a lower right part of a backside of the housing 3, an inlet 30 into which a plug of a power cord is inserted (see FIG. 4 and FIG. 5). The housing 3 has a primary power supply portion 31 in a front part of the inlet 30. The circuit board 32 is provided above the primary power supply portion 31. The primary power supply portion 31 converts AC power supplied via the inlet 30 into DC power, and supplies such power to the circuit board 32, a heat source of the fixing device 7, etc. The circuit board 32 converts the DC power supplied from the primary power supply portion 31 to voltage suitable for a motor (not illustrated) for driving the image forming device 6, the fixing device 7, the pair of conveying rollers 17 and the like, the control portion 2, the scanner 110, and the document sheet conveying device 120, and they receive such converted voltage.

A right side of the circuit board 32 faces an inner surface of a right side plate of the housing 3 through the shielding member 40. The document sheet conveying device 120 is electrically connected to the circuit board 32 using the cable 33 (see FIG. 4). The circuit board 32 supplies a power and a control signal to the document sheet conveying device 120 through the cable 33. A cross section of the cable 33 viewed in its axial direction has a substantially circular shape. The circuit board 32 has a Local Area Network (LAN) connector, a Universal Serial Bus (USB) connector, a memory card slot, a telephone line connector, etc. (not illustrated).

[Shielding Member]

The shielding member 40 (see FIG. 4, FIG. 6 to FIG. 8) is a member that electrically shields the circuit board 32 and is formed in a shape surrounding the circuit board 32. The shielding member 40 includes a first metal plate 41 facing the right side of the circuit board 32 and a second metal plate 42 facing a left side of the circuit board 32.

The first metal plate 41 is bent leftward at its rear end portion, thereby forming a first bending part 41F. The second metal plate 42 is bent rightward at its rear end portion, thereby forming a second bending part 42F. The first bending part 41F and the second bending part 42F are overlapped with each other at their end portions. In addition, the first bending part 41F has a notch 43 being opened leftward. The second bending part 42F closes the notch 43 from the left side to form the opening portion 44 having a rectangular shape. An opening portion 45 leading to the LAN connector and the like is provided below the opening portion 44.

The housing 3 has an opening portion 3A leading to a rear end portion of the shielding member 40 (see FIG. 2). The opening portion 3A is covered with a cover 3C made of resin. The cover 3C has an opening portion 3E leading to the opening portions 44 and 45 of the shielding member 40.

Since the shielding member 40 is made of a metal plate, it is required to take measures against damage to the cable 33 due to a contact with the opening portion 44.

In this regard, in the image forming apparatus 100 according to the present disclosure, it is possible to regulate movement in which, in the opening portion 44 of the shielding member 40, the cable 33 moves in its axial direction, and is possible to prevent damage to the cable 33 due to twisting.

[Protrusion]

The protrusion 34 is provided at a position of the cable 33 corresponding to the opening portion 44 (see FIG. 13). The protrusion 34 is formed by wrapping and bonding a resin binding band around the cable 33 along its circumferential direction. The protrusion 34 has a band shape such that the circumferential direction of the cable 33 is defined as a longitudinal direction. The protrusion 34 preferably has an annular shape.

[Guide Member]

The guide member 50 is provided in the opening portion 44 (see FIG. 7 to FIG. 9). The guide member 50 includes a tubular portion 51 surrounding the cable 33 and the annular groove portion 52 in which the protrusion 34 can be displaced along a circumferential direction of the cable 33. The groove portion 52 is provided in front of the tubular portion 51. An inner diameter of the groove portion 52 is larger than that of the tubular portion 51. An inner surface of the tubular portion 51 preferably has a cylindrical shape.

The guide member 50 is formed by joining a pair of components having the same shape (hereinafter referred to as a pair of guide assemblies 53, FIG. 10 to FIG. 12). The pair of guide assemblies 53 has a shape in which the guide member 50 is divided into two equal parts along the center of the tubular portion 51 and the groove portion 52. A snap-fitted male part 54M is provided at one end of an outer surface of the tubular portion 51 in its circumferential direction. A snap-fitted female portion 54F is provided at the other end of the outer surface of the tubular portion 51 in its circumferential direction. An inner surface of one of the pair of guide assemblies 53 face that of the other of the pair of guide assemblies 53, and the snap-fitted male part 54M is fitted into the snap-fitted female portion 54F, thereby forming the guide member 50.

A plate portion 60 perpendicular to a front-rear direction is provided behind the snap-fitted male part 54M and the snap-fitted female part 54F on an outer surface of the tubular portion 51. A first facing portion 61 facing the plate portion 60 is provided between the snap-fitted male part 54M and the plate portion 60. A second facing portion 62 facing the plate portion 60 is provided between the snap-fitted female part 54F and the plate portion 60. A first gap 61G between the plate portion 60 and the first facing portion 61 and a second gap 62G between the plate portion 60 and the second facing portion 62 each have a width equal to a thickness of the first metal plate 41 of the shielding member 40. An edge of the notch 43 is fitted into the first gap 61G and the second gap 62G.

In an actual assembling process, the inner surface of one of the pair of guide assemblies 53 face that of the other of the pair of guide assemblies 53, and the protrusion 34 of the cable 33 is inserted into the groove portion 52. Then, the snap-fitted male part 54M is fitted into the female part 54F, thereby integrating the pair of guide assemblies 53. Subsequently, the guide member 50 is inserted into the notch 43 of the first metal plate 41 of the shielding member 40. At this time, the first gap 61G and the second gap 62G of the guide member 50 are aligned with the edge of the notch 43, and the guide member 50 is slid into the notch 43. Then, the first metal plate 41 and the second metal plate 42 face each other and are fixed to each other. At this time, the second bent portion 42F closes the notch 43 from the left side, thereby fixing the guide member 50 to the opening portion 44.

According to the present embodiment as above, the image forming apparatus 100 includes: the shielding member 40 surrounding the circuit board 32 and having the opening portion 44 through which the cable 33 passes; the protrusion 34 that is provided in the cable 33; and the guide member 50 having the annular groove portion 52 in which the protrusion 34 can be displaced along the circumferential direction of the cable 33, the guide member 50 that is fitted into the opening portion 44. Accordingly, stress due to twisting is prevented even when the cable 33 is twisted at a time of opening and closing the document sheet conveying device 120. Therefore, it is possible to regulate movement in which, in the opening portion 44 of the shielding member 40, the cable 33 moves in its axial direction, and is possible to prevent damage to the cable 33 due to twisting.

In the image forming apparatus 100 according to the present embodiment, the guide member 50 has, on its outer surface, the first gap 61G and the second gap 62G into which the edge of the opening portion 44 of the shielding member 40 is fitted, thereby surely and easily fixing the guide member 50 to the opening portion 44.

In addition, in the image forming apparatus 100 according to the present embodiment, since the guide member 50 is formed by joining the pair of guide assemblies 53 having the same shape, the guide member 50 is easily assembled with low cost.

In addition, in the image forming apparatus 100 according to the present embodiment, the protrusion 34 has an annular shape, which can further reduce sliding resistance of the protrusion 34.

The above-described embodiment may be modified as follows.

In the above-described embodiment, as an example, the hinge 3H is provided at the rear end portion on the upper surface of the housing 3, but the present disclosure may be applied to the image forming apparatus 100 having the hinge 3H provided at a left end portion or a right end portion on the upper surface of the housing 3.

In the above-described embodiment, as an example, the circuit board 32 is provided in an upper right portion on the backside inside the housing 3. However, any position of the circuit board 32 is acceptable as long as the circuit board 32 is positioned at a side where the hinge 3H is provided, in an upper part of the housing 3.

In the above-described embodiment, as an example, the guide member 50 is formed by joining the pair of guide assemblies 53 having the same shape, but may be formed by joining any parts having different shapes to each other.

In the above-described embodiment, as an example, the protrusion 34 has a band shape such that the circumferential direction of the cable 33 is defined as the longitudinal direction. The protrusion 34 may have any shape at least as long as the protrusion 34 protrudes from the cable 33 toward its radial direction. When the protrusion 34 does not have the band shape, the protrusion 34 may be provided at a plurality of positions along the circumferential direction of the cable 33.

In the above-described embodiment, as an example, the protrusion 34 has an annular shape, but may have an ellipse outer circumferential surface.

In the above-described embodiment, as an example, the cross section of the cable 33 has a circular shape, but may have any shape. For example, the cross section of the cable 33 may have an ellipse shape, a shape formed by connecting a pair of semicircles with two straight lines, a rectangular shape, etc.

In the above-described embodiment, as an example, the protrusion 34 is formed by bonding the cable 33 to the binding band, but may be formed by using other methods. For example, the protrusion 34 may be formed by inserting the cable 33 into a metal member having an inner diameter slightly larger than the cable 33 and having a shape in which a part of annulus is cut off, and by plastically deforming the metal member.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a housing accommodating a document sheet reading device that reads a document sheet;
   a document sheet conveying device being coupled to an upper surface of the housing through a hinge, the document sheet conveying device conveying the document sheet along a conveyance path through which the document sheet passes via a scanning position of the document sheet reading device;
   a cable electrically connecting a circuit board accommodated in the housing to the document sheet conveying device;
   a shielding member surrounding the circuit board and including an opening portion through which the cable passes;
   a protrusion protruding from the cable in a radial direction of the cable; and
   a guide member having a tubular portion extending along the cable and surrounding the cable and groove portion formed along a circumferential direction of the tubular portion in an inner circumferential surface of the tubular portion and configured to accommodate the protrusion so as to be displaceable in the circumferential direction, the tubular portion fitted into the opening portion.

2. The image forming apparatus according to claim 1, wherein
   an outer surface of the tubular portion is provided with: a plate portion orthogonal to an extending direction of the tubular portion; and a facing portion facing the plate portion in the extending direction and forming, between the facing portion and the plate portion, a gap into which an edge of the opening portion of the shielding member is fitted, and
   the plate portion covers the edge of the opening portion outside the shielding member.

3. The image forming apparatus according to claim 2, wherein
   the guide member is formed by joining a pair of parts having a same shape by snap fitting.

4. The image forming apparatus according to claim 1, wherein
   the protrusion has an annular shape.

5. The image forming apparatus according to claim 3, wherein
   the tubular portion is formed in a cylindrical shape,
   each of the parts includes a semi-cylindrical portion forming one half of the tubular portion,
   the semi-cylindrical portion of one of the parts includes: a snap-fitted female part extending from an end of an outer circumferential surface of the semi-cylindrical portion in the circumferential direction to the semi-cylindrical portion of another one of the parts; a snap-fitted male part engaged with the female part of the semi-cylindrical portion of the another one of the parts on a back side of the female part on the outer circumferential surface of the semi-cylindrical portion; and the facing portion extending to the semi-cylindrical portion of the another one of the parts at a position apart from the male part in the extending direction of the tubular portion.

6. The image forming apparatus according to claim 2, wherein the opening portion is formed by a notch provided in a first metal plate and a second metal plate configured to close an opening of the notch by overlapping the first metal plate, and the tubular portion is fitted into the notch before the opening is closed, and then the second metal plate closes the opening of the notch, so that the tubular portion is attached to the opening portion.

* * * * *